United States Patent

Blue

[15] 3,643,888
[45] Feb. 22, 1972

[54] BOBBIN SLEEVE FOR WINDING OF TEXTILE FIBERS

[72] Inventor: Louis D. Blue, Wyomissing, Pa.
[73] Assignee: Essex Chemical Corporation, Myerstown, Pa.
[22] Filed: Sept. 11, 1970
[21] Appl. No.: 71,497

[52] U.S. Cl. ................................................ 242/118.32
[51] Int. Cl. ................................ B65h 75/26, B65h 75/10
[58] Field of Search .................... 242/118.32, 118.31, 118.3, 242/118, 125.1, 159, 172, 18 G

[56] References Cited

UNITED STATES PATENTS

| | | | |
|---|---|---|---|
| 2,017,611 | 10/1935 | Stogner | 242/118.32 |
| 2,569,094 | 9/1951 | Dunlap | 242/118.32 |
| 3,450,370 | 6/1969 | Hawkins | 242/118.32 |

FOREIGN PATENTS OR APPLICATIONS

| | | | |
|---|---|---|---|
| 1,465,903 | 12/1966 | France | 242/118.32 |

Primary Examiner—George F. Mautz
Attorney—McLean, Morton, and Boustead

[57] ABSTRACT

This invention relates to a bobbin sleeve upon which textile fibers, such as those made of glass, can be wound. The sleeve is made of a thermoplastic polymer, such as polypropylene, and is characterized by protrusions formed into the wall of the tube to minimize sliding of the fiber package.

4 Claims, 3 Drawing Figures

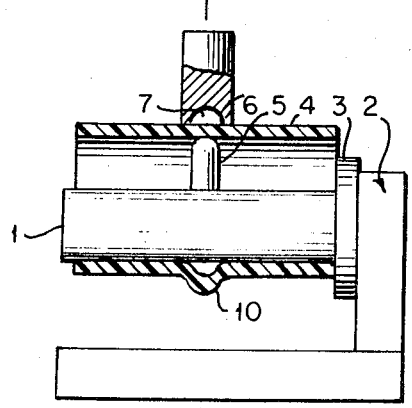
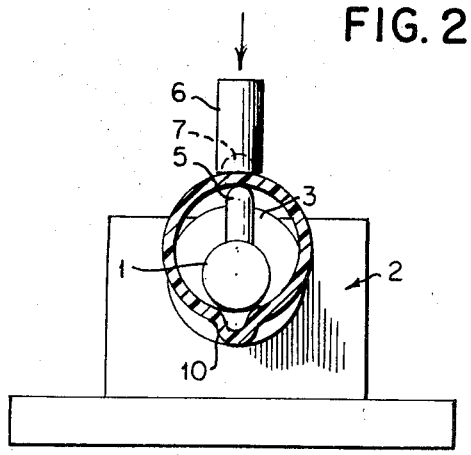
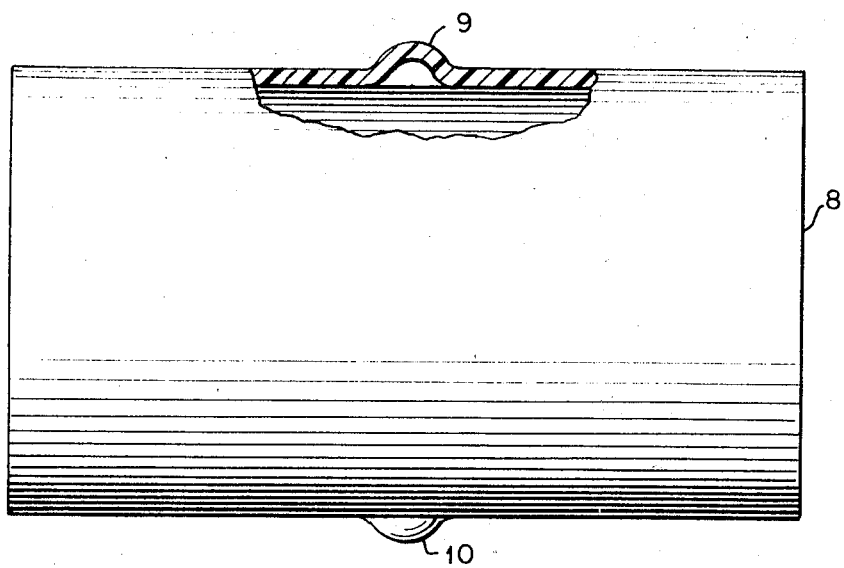
LOUIS D. BLUE
*INVENTOR.*
FIG. 3

BOBBIN SLEEVE FOR WINDING OF TEXTILE FIBERS

BRIEF SUMMARY OF THE INVENTION

It is known in the art to manufacture bobbin sleeves made of laminated paper. Such sleeves are not too satisfactory in certain applications, however, such as in the drawing and winding of glass textile fibers. The reason for this is that a spray or mist of water is applied to the glass fiber in order to cool it, and the water tends to disintegrate the laminated paper.

It is also known in the art to manufacture bobbin sleeves from plastics. Thus, U.S. Pat. No. 3,034,743 to Hill, patented May 15, 1962, discloses plastic sleeves, the surface of which is grooved in the molding operation or by cutting in order to reduce sloughing of yarn wound upon the sleeves. U.S. Pat. No. 3,263,952 to Elwell, patented Aug. 2, 1966, describes plastic sleeves which have been sand blasted to provide an irregular surface in order to reduce sloughing.

There are instances, such as in the drawing and winding of textile fibers made of glass, where the industry desires a sleeve which has a smooth surface but which can be used without undue sloughing. The present invention provides such a sleeve which, moreover, is made of plastic material, thereby avoiding problems attendant the use of laminated paper sleeves.

DETAILED DESCRIPTION

In accordance with the present invention, a bobbin sleeve, useful in the winding of textile fibers including glass fibers, is made of a thermoplastic polymer. The polymer can, for example, be a hydrocarbon polymer such as polyethylene or polypropylene; a formaldehyde polyacetal such as Delrin; nylon; a tetrafluoropolyethylene such as Teflon; a chlorotrifluoropolyethylene; polyvinyl chloride; or a softer, resilient copolymer or terpolymer such as actylonitrile-butadiene-styrene polymer ("ABS").

The bobbin sleeve is made by first extruding in the known manner and cutting the extrusion into appropriate lengths. After this is done, the tube may be placed over a supported mandrel with a male forming pin held pointed outward. A female die is aligned with the pin on the outside of the tube. When the tube is positioned correctly, the die is forced over the pin, forming a protrusion ranging from 0.030–0.500 inch in height and from ¼ to 2 inches in diameter at its base. This procedure may be repeated several times around the tube. A typical sleeve will have two opposing protrusions equidistant from the ends.

EXAMPLE

Polypropylene is extruded to provide a tube which is 6.365 inches in inside diameter and 0.057-inch wall thickness. The tube is then cut into pieces 11 inches long.

Referring now to the accompanying drawing, FIG. 2 is a cross section taken along the line 2—2 of FIG. 1. FIG. 1 and FIG. 2 show a mandrel 1 (suitably made of steel) mounted upon base 2. The mandrel is provided with circumferential collar 3 to aid in positioning upon the mandrel the tube 4 made as described in the preceding paragraph. The mandrel is also provided with a male forming pin 5, also suitably made of steel. Pin 5 has a hemispherical top and is 1 inch in diameter.

FIG. 1 and FIG. 2 also show female die 6 provided with hemispherical cavity 7 having a diameter of 1.114 inches. Die 6 is also suitably made of steel. In order to make a finished sleeve 8 of this invention (shown in FIG. 3), die 6 is forced downwardly, thereby forming protrusion 9 of FIG. 3. The sleeve is then rotated 180°, and the operation repeated, forming protrusion 10 of FIG. 3.

I claim:

1. An article of manufacture suitable for use as a textile bobbin sleeve, the said article being made of a thermoplastic polymer and the said article having a smooth exterior and being cylindrical in shape and being provided on its external surface with two protrusions each located equidistant the ends of said article, the said protrusions being located opposite each other on the surface of the said article.

2. The article of claim 1 wherein said polymer is a polypropylene.

3. The article of claim 1 wherein said protrusions are from 0.030 to 0.500 inch in height and from ¼ to 2 inches in diameter at their base.

4. The article of claim 1 wherein said polymer is a polypropylene and wherein said protrusions are from 0.030 to 0.500 inch in height and from ¼ to 2 inches in diameter at their base.

* * * * *